(12) United States Patent
Stanikowski et al.

(10) Patent No.: US 8,930,016 B2
(45) Date of Patent: Jan. 6, 2015

(54) METHOD AND SYSTEM FOR ARRANGING ROD-LIKE ELEMENTS

(71) Applicant: International Tobacco Machinery Poland Sp. z o.o., Radom (PL)

(72) Inventors: Andrzej Stanikowski, Radom (PL); Robert Chmielewski, Jedlnia Letnisko (PL); Wojciech Jerzy Chojnacki, Radom (PL); Andrzej Sulkowski, Jedlinsk (PL); Marek Sieredzinski, Radom (PL); Krzysztof Stolarski, Radom (PL)

(73) Assignee: International Tobacco Machinery Poland Sp. z o.o., Radom (PL)

( * ) Notice: Subject to any disclaimer, the term of this patent is extended or adjusted under 35 U.S.C. 154(b) by 0 days.

(21) Appl. No.: 13/734,304

(22) Filed: Jan. 4, 2013

(65) Prior Publication Data

US 2013/0178975 A1    Jul. 11, 2013

(30) Foreign Application Priority Data

Jan. 5, 2012   (PL) .......................................... 397716

(51) Int. Cl.
| | |
|---|---|
| G06F 7/00 | (2006.01) |
| G06F 17/00 | (2006.01) |
| A24C 5/36 | (2006.01) |
| B07C 5/342 | (2006.01) |

(52) U.S. Cl.
CPC . *G06F 17/00* (2013.01); *A24C 5/36* (2013.01); *B07C 5/3422* (2013.01)
USPC ............ 700/223; 700/213; 700/228; 700/230

(58) Field of Classification Search
None
See application file for complete search history.

(56) References Cited

U.S. PATENT DOCUMENTS

| 3,233,613 A | 2/1966 | Körber et al. |
| 3,395,570 A | 8/1968 | Kochalski |

(Continued)

FOREIGN PATENT DOCUMENTS

| DE | 1106 227 | 9/1957 |
| DE | 20 2005 010 375 U1 | 11/2005 |

(Continued)

OTHER PUBLICATIONS

Extended European Search Report, European Patent Application No. 13150242.9-1656, dated May 21, 2013 (5 pgs).

(Continued)

*Primary Examiner* — Yolanda Cumbess
(74) *Attorney, Agent, or Firm* — Nixon & Vanderhye P.C.

(57) ABSTRACT

Method for arranging rod-like elements including cigarette parts such as filter and tobacco parts, in which elements are delivered to a conveyor having successive sectors which arrange the elements in separate rows along the conveyor. The type, number and location of element transported on the conveyor are determined by at least a single scanning of each successive element on the conveyor. The scanned results are transmitted to a control unit which assigns each sector of the conveyor information according to its contents. The elements are subsequently sorted based on the information received by the control unit according to the type and the number of parts each element is composed of, the orientation of these parts in relation to the direction of movement of the conveyor. Each of the successive elements is transferred to a predetermined receiving area based on the information received from the control unit.

13 Claims, 7 Drawing Sheets

(56) References Cited

U.S. PATENT DOCUMENTS

| | | | |
|---|---|---|---|
| 3,404,688 A | 10/1968 | Pinkham et al. | |
| 4,056,463 A | 11/1977 | Hansen, Jr. | |
| 4,362,235 A | * 12/1982 | Erdmann | 198/418.3 |
| 5,076,291 A | 12/1991 | Grove et al. | |

FOREIGN PATENT DOCUMENTS

| | | |
|---|---|---|
| DE | 10 2004 031 187 A1 | 1/2006 |
| EP | 1 416 265 A1 | 5/2004 |
| EP | 2 364 605 A2 | 9/2011 |
| FR | 2 893 518 A1 | 5/2007 |
| PL | 362073 A1 | 3/2004 |
| WO | WO 2005/087394 A1 | 9/2005 |

OTHER PUBLICATIONS

Decision on patent grant issued on May 15, 2014 in corresponding Russian Application No. 2012155785, filed Dec. 24, 2012 (9 pgs).

* cited by examiner

METHOD AND SYSTEM FOR ARRANGING ROD-LIKE ELEMENTS

The present invention relates to a method and a system for arranging rod-like elements constituting production waste in tobacco industry.

BACKGROUND OF THE INVENTION

Devices for cutting cigarette tobacco parts off their filter parts are known in the art. Document U.S. Pat. No. 3,404,688 discloses a device for cutting open the elements of so called "double cigarettes" containing a double filter part and two tobacco parts. Such elements are cut open if their tobacco parts have been filled with the tobacco in a faulty manner.

Document U.S. Pat. No. 3,233,613 discloses a device for cutting open both double and regular cigarettes that do not fulfill quality requirements.

The device disclosed in U.S. Pat. No. 5,076,291 enables cutting open defective single cigarettes that are not arranged in any orderly manner, i.e. having their filter parts oriented in both possible directions.

Document DE 1106227 presents a device for cutting cigarette tobacco parts off their filter parts, the device requiring an orderly arrangement of the cigarettes with their filters oriented in one direction on the position of a disc knife used for cutting the cigarette parts.

Devices for arranging rod-like waste elements constituting a mixture of various types of elements, i.e. a mixture of both single and double cigarettes as well as separate filter and tobacco parts, are not known in the art.

SUMMARY OF THE INVENTION

The object of the invention is to provide a system and a method for arranging rod-like waste elements produced at various stages of a cigarette production process.

According to the invention a method of arranging rod-like elements is provided, in which an unordered portion of rod-like elements composed each of at least one part selected from a group including cigarette parts being filter parts and tobacco parts, is delivered to a conveyor having successive sectors defined and enabling arrangement of the elements on the said conveyor in separate rows along the axes of the elements and along the conveyor axis.

The method is characterized in that the type, the number and the location of the parts of each element transported on the conveyor are defined by at least a single scanning of each successive element on the conveyor, the result of the scanning being transmitted to a control unit in which each sector of the conveyor is assigned information about its contents, the elements being subsequently sorted out, basing on the information received from the control unit, by the type and the number of parts each element is composed of, as well as by the orientation of these parts in relation to the direction of movement of the conveyor, by transferring the successive elements to suitable receiving means selected according to the information received from the control unit.

The scanning is preferably performed by means of at least one longitudinal scanning head extending in a direction along the rows of elements transported on the conveyor.

Each element may be scanned at least once by means of a scanning head moving above a respective row of the elements transported on the conveyor.

Each element is preferably scanned by means of two scanning heads moving to and fro cyclically along the direction of movement of the conveyor and above a respective row of the elements transported on the conveyor.

Preferably, scanning heads are used enabling detecting at least one of the features selected from a group containing: external color of an element, density of the contents of an element, contrast of scanned elements in the scanned area and presence of a detectable indicator on a scanned part of an element.

Also preferably, successive elements are sorted out and transferred to a suitable receiving means by locating them in separate chambers of the receiving means, the chambers collecting respectively the elements selected from a group containing: elements composed of two tobacco parts combined with two filter parts, elements composed of one tobacco part combined with two filter parts, the tobacco part of which being located on the rear side of the element in relation to its direction of movement, elements composed of one tobacco part combined with two filter parts, the tobacco part of which being located on the front side of the element in relation to its direction of movement, elements composed exclusively of filter parts, elements composed of a tobacco part combined with a filter part, the tobacco part of which being located on the front side of the element in relation to its direction of movement, elements composed of a tobacco part combined with a filter part, the tobacco part of which being located on the rear side of the element in relation to its direction of movement, elements composed exclusively of tobacco parts.

According to another aspect of the invention, a system is provided for arranging rod-like elements composed each of at least one part selected from a group including cigarette parts being filter parts and tobacco parts, comprising a conveyor onto which an unordered portion of the rod-like elements is delivered, the conveyor having successive sectors defined and enabling arrangement of the elements on the said conveyor in separate rows along the axes of the elements and along the conveyor axis.

The system is characterized in that a scanning means is located above each row of the elements on the conveyor enabling at least a single scanning of each successive element transported on the conveyor and enabling definition of the type, the number and the location of the parts of each successive element in each row, the system being further provided with a control unit assigning each sector of the conveyor the information about its contents, and in that the system is further provided with a feeding means and a receiving means for the elements which are sorted out basing on the information received from the control unit, by the type and the number of the parts each element is composed of, as well as by the orientation of these component parts within a respective sector of the conveyor, the feeding means and the receiving means cooperating with the control unit.

The control unit is preferably a programmable controller or an industrial computer.

Preferably, the scanning means is constituted by at least one scanning head located above the conveyor, the scanning head moving to and fro along the route of the conveyor, cyclically, in the direction of the movement of the conveyor and against it.

The scanning head may comprise a plurality of scanning sections, each scanning section comprising a different sensor adapted to detect at least one of the features selected from a group containing: external color of the element, density of the contents of the element, presence of a detectable indicator on the scanned part of the element and contrast of the scanned parts of the elements.

The receiving means preferably comprise containers, receiving channels or conveyors into which the elements are fed from the conveyor.

System according to claim 8, characterized in that the feeding means comprise conveyors, channels and/or compressed air nozzles.

Preferably, the system is associated with a cutting unit for separating the tobacco parts from the filter parts.

BRIEF DESCRIPTION OF THE DRAWINGS

An exemplary embodiment of the system and the method of the invention is illustrated in the drawing, in which.

DETAILED DESCRIPTION OF THE INVENTION

Figure 1:
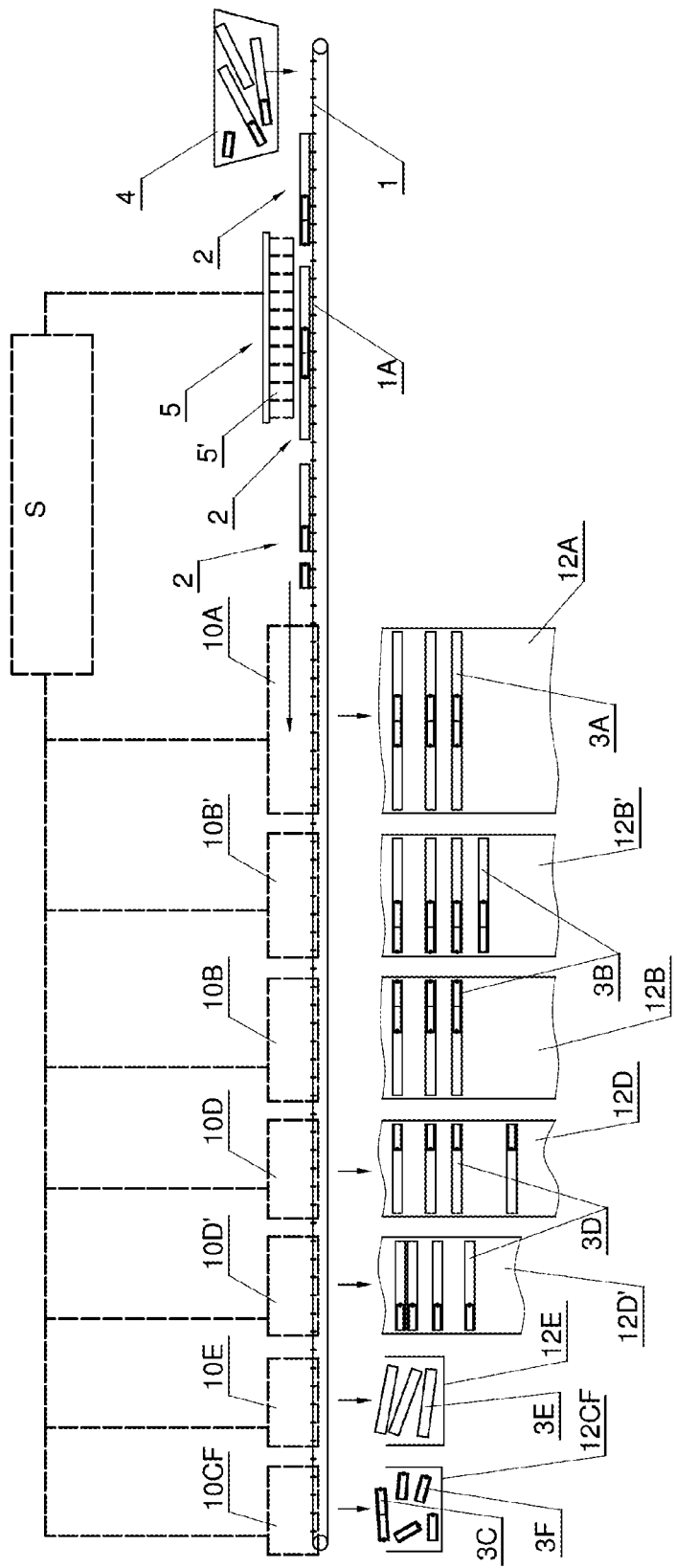
FIG. 1 shows the exemplary embodiment of the system according to the invention.

FIG. 1 shows an exemplary embodiment of the system for arranging rod-like waste elements, comprising a conveyor 1 for the elements 3, a chute 4 delivering the elements 3, a scanning head 5, feeding means 10 and a plurality of receiving means 12A, 12B, 12B', 12CF, 12D, 12D', 12E. Each element 3 is transported under the scanning head 5 provided with a plurality of scanning sections 5'. The scanning head 5 may be stationary or may reciprocate along the conveyor 1. The information about the successive transported elements 3, having the form of the data concerning the parts of the elements located in respective sectors 1A, is stored in a control unit S. The control unit S may be constituted by a programmable controller or an industrial computer. Basing on the data received from the scanning head 5, the control unit S gathers information regarding the type of the elements 3 as well as about their orientation versus the direction of their movement, specifically about their location in the conveyor sectors. Conventional feeding means are located in a feeding zone which is divided into a plurality of sub-zones 10A, 10B, 10B', 10CF, 10D, 10D', 10E, the feeding means feeding successive waste elements to respective receiving means. The feeding means may comprise mechanical pushers driven by any suitable means or compressed air nozzles. The waste elements 3A are fed to the conveyor 12A in the zone 10A, the elements 3B having their filters directed towards the rear side in relation to the conveyor movement are fed to the conveyor 12B in the zone 10B, the elements 3B having their filters directed towards the front side in relation to the conveyor movement are fed to the conveyor 12B' in the zone 10B'. The elements 3D having their filters directed towards the rear side in relation to the conveyor movement are fed to the conveyor 12D in the zone 10D, the elements 3D having their filters directed towards the front side in relation to the conveyor movement are fed to the conveyor 12D' in the zone 10D'. The waste elements 3E are fed to the container 12E in the zone 10E, while the elements 3C and 3F are located in the container 12CF in the zone 10CF. Having been arranged this way, the elements may be fed directly to a cutting unit for separating the tobacco parts from the filter parts.

Figure 2:
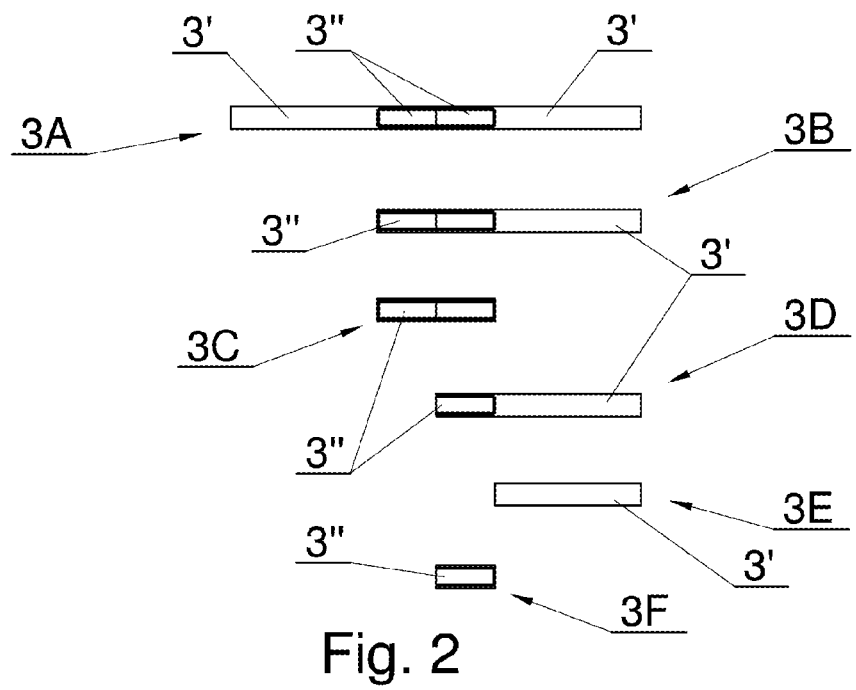
FIG. 2 shows various types of rod-like waste elements.

FIG. 2 illustrates examples of rod-like elements 3 being waste products of the cigarette production process, the elements including:

elements 3A consisting of two tobacco parts 3' combined with two filter parts 3" constituting two cigarettes connected with each other;

elements 3B consisting of one tobacco part 3' combined with two filter parts 3";

elements 3C consisting of two filter parts 3" connected with each other;

elements 3D consisting of one tobacco part 3' combined with one filter part 3" constituting a complete cigarette;

elements 3E consisting of just one tobacco part 3';

elements 3F consisting of just one filter part 3".

The conveyor 1 is designed for transporting the waste elements 3 delivered e.g. from a chute 4, the elements being arranged in rows along the conveyor 1. The conveyor 1 comprises a plurality of sectors 1A, which means that in an exemplary belt conveyor, the belt is theoretically divided into sectors by the control unit. Information about the elements located in the individual sectors 1A is being assigned to these sectors, the information including the data concerning the parts of elements 3 in the given sectors of the individual rows 2. In practice, the scanning head 5 transmits the information about the result of the scanning to the control unit S which in turn assigns this information to each row 2 of the element parts. The row 2 is to be understood to be the row of waste element parts gathered within a length equal to a sum of two tobacco parts and two filter parts.

Figure 3:
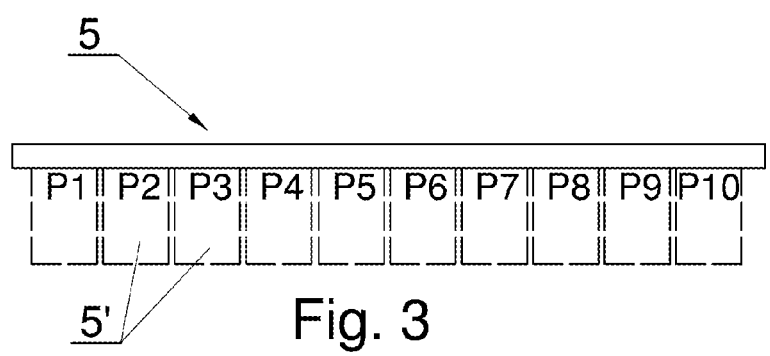
FIG. 3 shows a side view of an exemplary scanning head.

FIG. 3 shows a side view of an exemplary scanning head 5 comprising a plurality of scanning sections 5', e.g. P1 to P10, each scanning section 5' being equipped with various types of sensors adapted to detect among others the presence or absence of an object in the scanned area, the color of the surface of the element, the contrast of the scanned elements in the scanned area, the density of the contents of the element, and to read detectable indicators located on the surface of the element.

Figure 4:
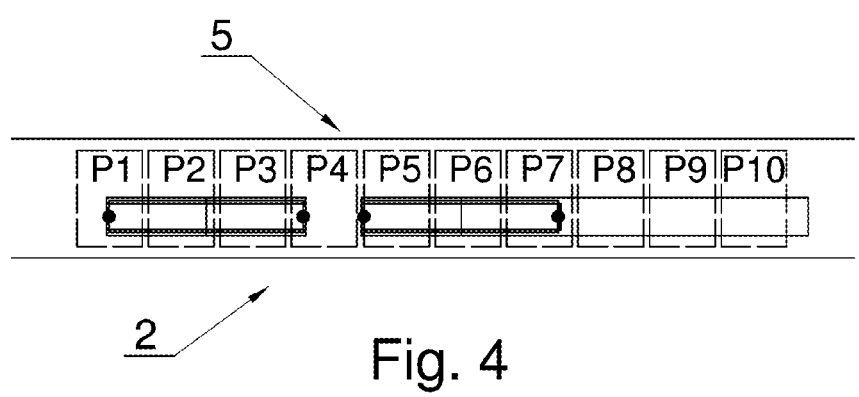
FIG. 4 shows a top view of the scanning head.

FIG. 4 shows a top view of the scanning head 5 located above the conveyor 1, the scanning head 5 extending along the exemplary row 2 comprising the parts of the waste elements 3.

Figure 5:
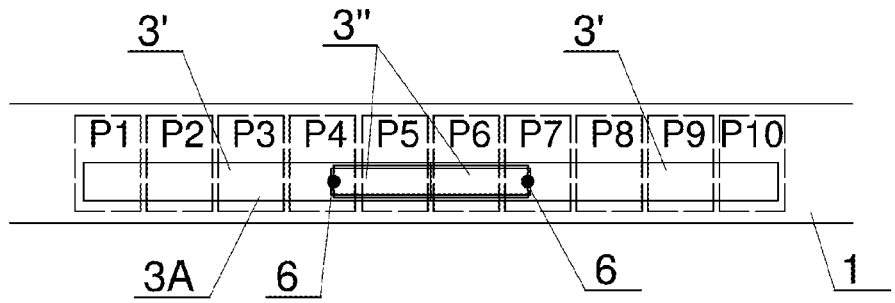
FIGS. 5-8 show examples of rod-like waste elements scanned by the scanning head.
Figure 6:
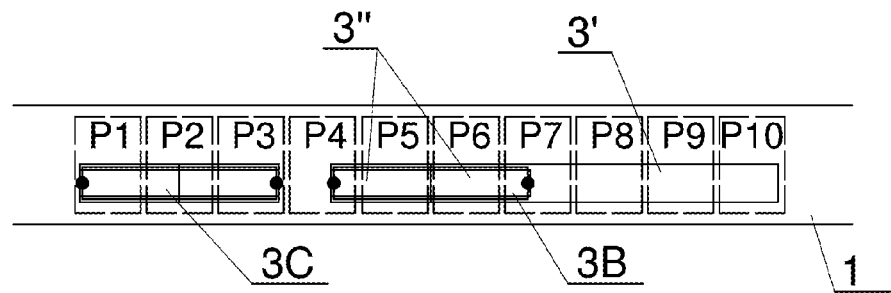
Figure 7:
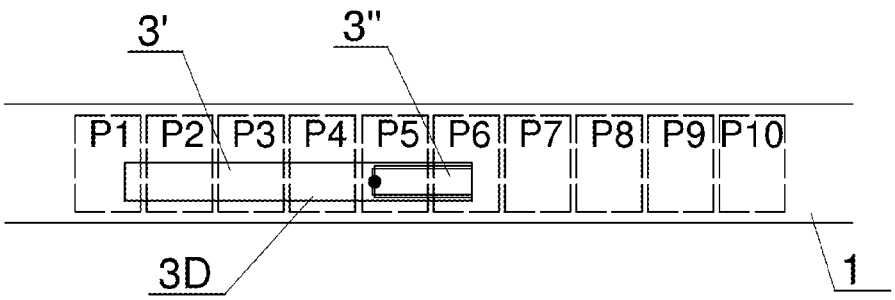
Figure 8:
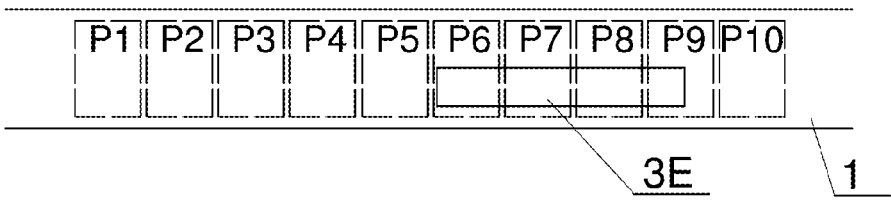

FIGS. 5-8 show examples of rod-like waste elements scanned by the scanning head 5. FIG. 5 shows the element 3A consisting of two tobacco parts 3' combined with two filter parts 3", the scanning head being able to scan among others the indicators 6 that have been purposefully introduced onto the surface of the element e.g. near the connection of the tobacco part 3' with the filter part 3". All the scanning sections 5' will detect the presence of the element 3A, the sections P4 to P7 will detect the presence of the filter parts 3", the sections P4 and P7 will detect the presence of the indicators 6, while the sections P1, P2, P3, P8, P9 and P10 will detect the presence of the tobacco parts 3'. The result of the scanning is transmitted to the control unit S (not shown) and the scanned sector is assigned the information about its contents. On FIG. 6, the waste elements 3B and 3C are located in an exemplary row 2. The scanning sections P1, P2 and P3 will detect the presence of the filter parts 3", while the sections P1 and P3 will detect the presence of the indicators 6. The section P4 will detect the presence of a fragment of the filter part 3" and the presence of the indicator 6, the sections P7, P8, P9 and P10 will detect the presence of the tobacco part. On FIG. 7, the waste element 3C is located in another exemplary row 2. The scanning sections P1 to P6 will detect the presence of the waste element, the sections P1 to P4 will detect the presence of the tobacco part 3', the sections P5 and P6 will detect the presence of the filter part 3", and the section P5 will detect the presence of the indicator 6. The scanning sections P6 to P9 in FIG. 8 will detect the presence of the filter part 3" of the waste element 3F, while the other scanning sections 5' will detect absence of the elements. In each of the above described cases the control unit S receives information about the type and/or types of the waste elements and about its (their) orientation in the row.

The waste elements 3 may be scanned by means of at least one stationary scanning head and/or at least one movable scanning head that is adapted to scan the elements repeatedly.

Figure 9:
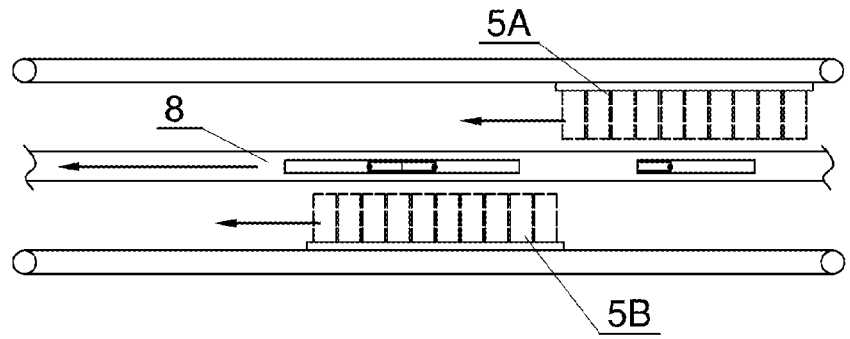
FIG. 9-12 show another exemplary embodiment of the system in which two scanning heads move along the conveyor.

FIG. 9 shows the exemplary scanning heads 5A and 5B moveable along the conveyor at a speed that is close to the speed of the conveyor 1 and the waste elements 3 located thereon.

Figure 10:
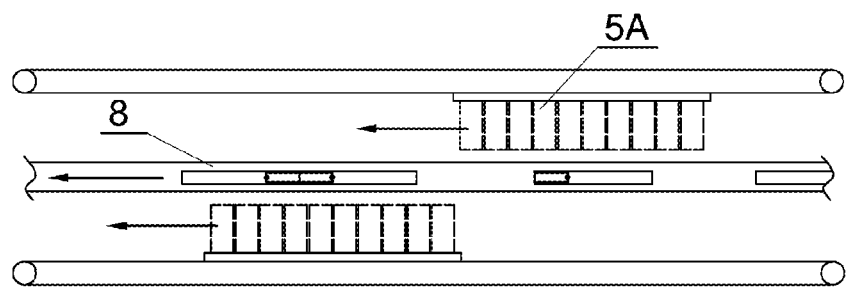
Figure 11:
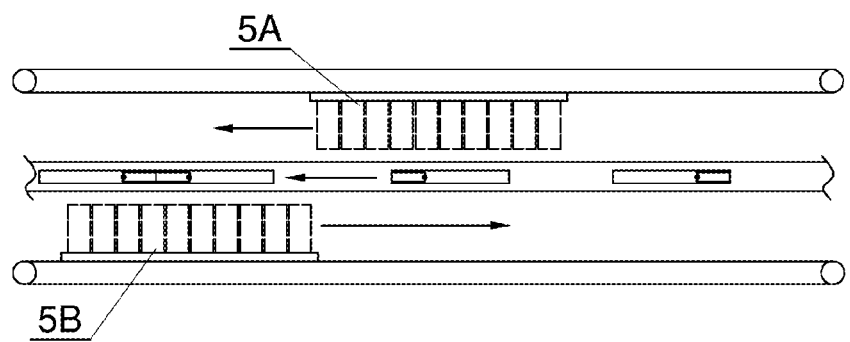
Figure 12:
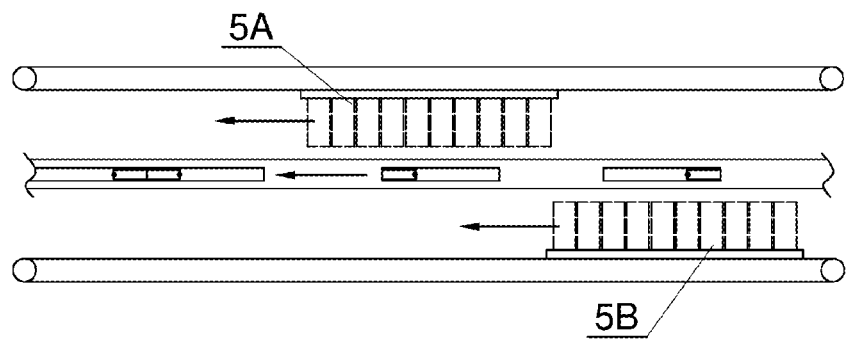

FIG. 10 shows the situation during scanning of the elements, while on FIG. 11 the scanning head 5B just stopped scanning in order to be retreated to its position shown on FIG. 12 from where it will start the scanning again, just behind the scanning head 5A as seen along the conveyor 1.

Figure 13:
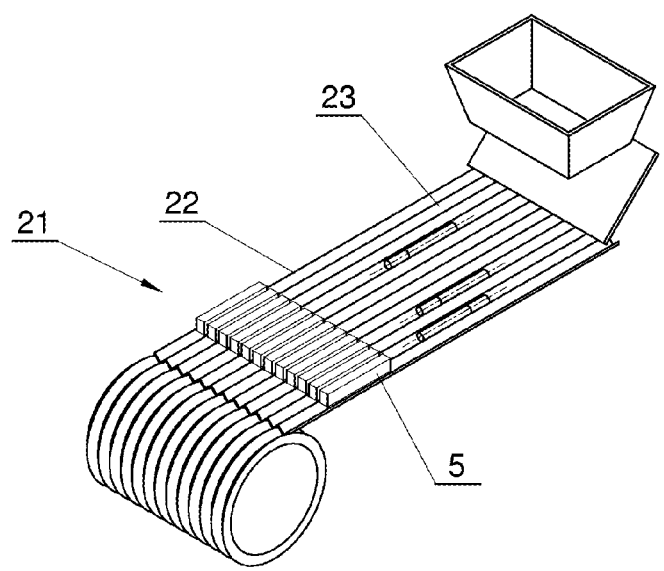
FIG. 13 shows another embodiment of the system having two scanning heads located above a vibrating conveyor.

FIG. 13 shows an embodiment of the system in which the stationary or moveable scanning heads may be located above a conveyor of another type, e.g. a vibrating conveyor 21. The vibrating conveyor may have a vibrating member 22 provided with many rows 23. A multi-row belt conveyor may also be used. It should be noted that in any case a scanning head 5 is advantageously located above each row. Basing on the data gathered by the scanning heads 5, the elements may be delivered to the suitable receiving means.

Figure 14:
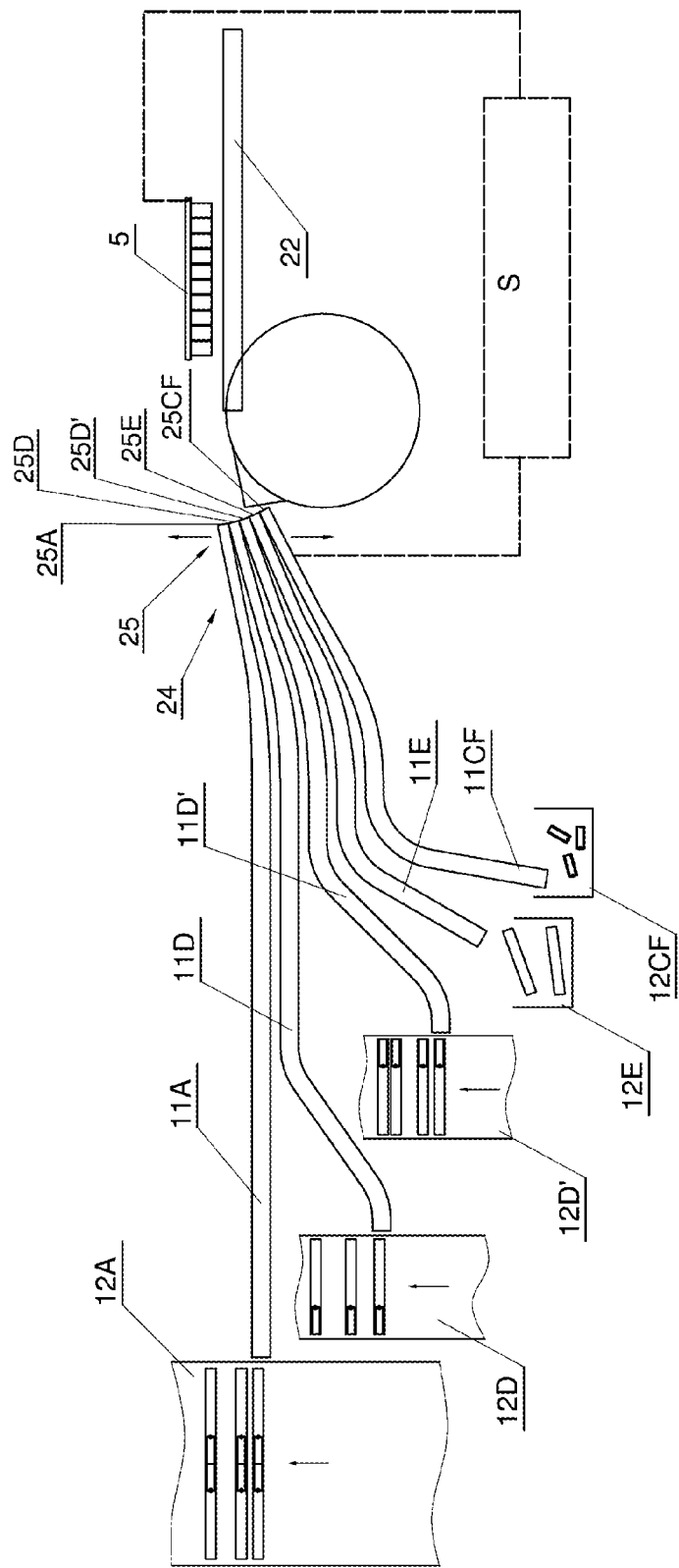
FIG. 14 shows another exemplary embodiment of the system with the vibrating conveyor.

In the embodiment of the system shown on FIG. 14, each row 23 of the conveyor 21 is provided with a distributing member 24. The position of each distributing member 24 is changed substantially in the direction up-and-down depending on the data about the transported waste elements 3 so as to enable suitable positioning of the catching members 25, 25D, 25D', 25E, 25CF of the distributing member 24. The waste elements are directed respectively to the catching members 25, 25D, 25D', 25E, 25CF. The waste elements are delivered to the receiving means 12A, 12CF, 12D, 12D', 12E by means of the feeding means 11A, 11CF, 11D, 11D', 11E in the form of conveyors or channels.

Figure 15:
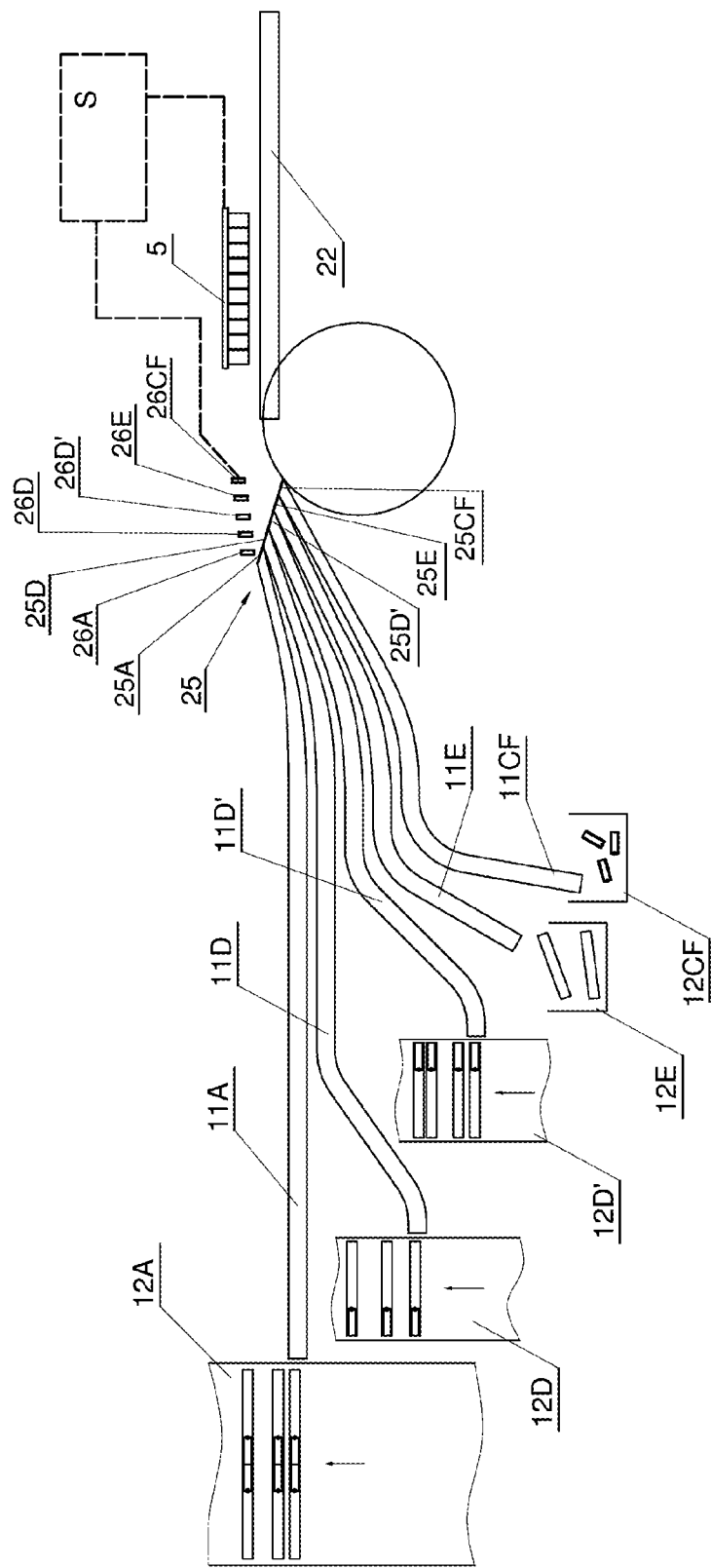
FIG. 15 shows still another exemplary embodiment of the system according to the invention.

FIG. 15 shows a similar embodiment as that of FIG. 14, but the waste elements are directed to the inlets 25A, 25D, 25D' 25E and 25CF by means of the feeding means in the form of compressed air nozzles 256A, 26D, 26D' 26E and 26CF.

The invention claimed is:

1. A method for arranging rod-like elements;
each of said rod-like elements including cigarette parts selected from the group consisting of filter parts and tobacco parts;
an unordered portion of the rod-like elements is delivered to a conveyor having successive sectors defined and enabling arrangement of the elements on the said conveyor in separate rows along the axes of the elements and along the conveyor axis;
wherein the type, the number and the location of the parts of each element that are transported on the conveyor are determined by at least a single scanning of each successive element on the conveyor;
wherein the scanned results are transmitted to a control unit and the control unit assigns each sector of the conveyor information according to its contents;
the elements are subsequently sorted out, based on the information received by the control unit according to: (a) the type and the number of parts each element is composed of; and (b) the orientation of these parts in relation to the direction of movement of the conveyor; and
transferring each of the successive elements to predetermined receiving means that is selected based on the information received from the control unit.

2. Method according to claim 1, wherein the scanning is performed by at least one longitudinal scanning head that extends in a direction along the rows of elements transported on the conveyor.

3. Method according to claim 1, wherein each element is scanned at least once by a scanning head moving above a respective row of the elements transported on the conveyor.

4. Method according to claim 1, wherein each element is scanned by two scanning heads moving to and fro cyclically along the direction of movement of the conveyor and above a respective row of elements transported on the conveyor.

5. Method according to claim 1, wherein the scanning heads enable the detection of at least one feature selected from a group of features consisting of (a) external color of an element, (b) density of the contents of an element, (c) contrast of scanned elements in the scanned area and (d) presence of a detectable indicator on a scanned part of an element.

6. Method according to claim 1, wherein successive elements are sorted to a suitable receiving means by transferring the elements in separate chambers of the receiving means;
wherein the respective chambers receive the elements selected from a group of elements consisting of: (a) elements composed of two tobacco parts combined with two filter parts, (b) elements composed of one tobacco part combined with two filter parts, wherein the tobacco part is located on the rear side of the element in relation to the direction of movement of the element; (c) elements composed of one tobacco part combined with two filter parts, wherein the tobacco part is located on the front side of the element in relation to the direction of movement of the element, (d) elements composed exclusively of filter parts connected with each other, (e) elements composed of one tobacco part combined with one filter part, wherein the tobacco part is located on the front side of the element in relation the direction of movement, (f) elements composed of a tobacco part combined with one filter part, wherein the tobacco part is located on a rear side of the element in relation to the direction of movement of the element; and (g) elements composed exclusively of tobacco parts.

7. System for arranging rod-like elements composed each of at least one part selected from a group including cigarette parts being filter parts and tobacco parts, comprising a conveyor onto which an unordered portion of the rod-like elements is delivered, the conveyor having successive sectors defined and enabling arrangement of the elements on the said conveyor in separate rows along the axes of the elements and along the conveyor axis, wherein a scanning means is located above each row of elements on the conveyor (1) enabling at least a single scanning of each successive element transported on the conveyor and enabling definition of the type, the number and the location of the parts of each successive element in each row, the system being further provided with a control unit assigning each sector of the conveyor the information about its contents, and in that the system is further provided with a feeding means and a receiving means for elements which are sorted out basing on the information received from the control unit, by the type and the number of the parts an element is composed of, as well as by the orientation of these component parts within a respective sector of the conveyor, the feeding means and the receiving means cooperating with the control unit.

8. System according to claim 7, wherein the control unit is a programmable controller or an industrial computer.

9. System according to claim 8, wherein the scanning head comprises a plurality of scanning sections; wherein each scanning section comprises a different sensor for detecting at least one feature selected from a group of features consisting of: (a) external color of the element; (b) the density of the contents of the element; (c) the presence of a detectable indicator on the scanned part of the element and (d) the contrast of the scanned parts of the elements.

10. System according to claim 7 wherein the scanning means is constituted by at least one scanning head located above the conveyor, the scanning head moving to and fro along the route of the conveyor, and cyclically, in the direction of the movement of the conveyor and against the movement of the conveyor.

11. System according to claim 7, wherein the receiving means comprise containers, receiving channels or conveyors into which elements are fed from the conveyor.

12. System according to claim 7, wherein the feeding means comprise conveyors, channels and/or compressed air nozzles.

13. System according to claim 7, associated with a cutting unit for separating the tobacco parts from the filter parts.

* * * * *